United States Patent [19]
Weinstein et al.

[11] Patent Number: 6,152,021
[45] Date of Patent: *Nov. 28, 2000

[54] COOKER DIE AND ROTARY CUTTER REMOVABLY SECURING MECHANISM

[75] Inventors: James N. Weinstein, Maple Grove; Thomas G. Cremers, Green Isle, both of Minn.

[73] Assignee: General Mills, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/487,028

[22] Filed: Jan. 19, 2000

[51] Int. Cl.$^7$ .............................. A23L 1/00; A23P 1/00; F16L 19/00; F16L 23/036
[52] U.S. Cl. .............................. 99/353; 99/450.7; 99/348
[58] Field of Search .............. 99/353–355, 450.1–450.8, 99/342, 483, 348; 264/209.2; 285/27, 360–363, 912, 913; 366/290, 291, 83–86; 425/131.1, 378.1, 463, 133.1, 462; 426/233, 448, 449, 514–516

[56] References Cited

U.S. PATENT DOCUMENTS

| | | |
|---|---|---|
| 363,133 | 5/1887 | Gavit . |
| 1,946,740 | 2/1934 | Hall . |
| 2,078,100 | 4/1937 | Royle . |
| 2,838,084 | 6/1958 | Samler . |
| 3,001,485 | 9/1961 | Czik . |
| 3,084,810 | 4/1963 | Vogel . |
| 3,130,468 | 4/1964 | McFall . |
| 3,139,844 | 7/1964 | Landers . |

(List continued on next page.)

FOREIGN PATENT DOCUMENTS

| | | |
|---|---|---|
| 2601619 | 1/1988 | France . |
| 1452372 | 8/1973 | Germany . |
| 2457532 | 6/1976 | Germany . |
| 3029767 | 5/1982 | Germany . |
| 3243184 | 5/1984 | Germany . |
| 1-9504119 | 8/1996 | Germany . |
| 592409 | of 1959 | Italy . |

(List continued on next page.)

OTHER PUBLICATIONS

Lihotzky, "Changers Made to Measure", No. 002–02, Sep. 1998 (6 pages), re European Patent No. 95 109 541.3 (extruders made to measure, 3–seconds–multifunctional screen, die and pelletizing knife changers and tool changer for all extruder systems).

Beringer Self–Lock Screen Changer for processing thermoplastics and other compounds. Beringer, Beringer Way, P.O. Box 485, Marble head, Mass. 01945, Jan. 1993.

Beringer Ultra–Lock Slide Plate Screen Plate Changer, Beringer, Beringer Way, P.O. Box 485, Marblehead, Mass. 01945–9978, Sep. 1994.

*Primary Examiner*—Timothy Simone
*Attorney, Agent, or Firm*—John A. O'Toole; Douglas J. Taylor; Alan D. Kamrath

[57] ABSTRACT

A mechanism (10) includes a slide plate (32) having die openings (38) adapted to hold dies (42a, 42b) and slideable relative to a cooker/extruder (12). Rotary cutters (74) are rotatably mounted relative to and moveable with the dies (42a, 42b). A motor (76) can be connected and disconnected to the rotary cutter (74) aligned with the cooker/extruder (12) by a male coupling (96) including an elastomeric band (106) tensioned in a groove (102) formed in an outer peripheral surface (100) and received within the inside surface (116) of a cylindrical body (114) of a female coupling (108). The rotary cutters (74) include a plurality of knives (90) mounted to an annular cutter head (82) rotatably mounted upon a center shaft (80) axially extending from each of the dies (42a, 42b). Thus, it is not necessary to shut down the cooker/extruder (12) to service or change the dies (42a, 42b) and/or the rotary cutters (74).

20 Claims, 2 Drawing Sheets

U.S. PATENT DOCUMENTS

| | | |
|---|---|---|
| 3,299,474 | 1/1967 | Ashworth, Jr. . |
| 3,345,854 | 10/1967 | Gross . |
| 3,354,686 | 11/1967 | Petsch . |
| 3,391,565 | 7/1968 | Linnerz et al. . |
| 3,543,557 | 12/1970 | Lomas . |
| 3,599,467 | 8/1971 | Valks . |
| 3,834,208 | 10/1974 | Schmidt . |
| 3,947,202 | 3/1976 | Göller et al. . |
| 4,395,212 | 7/1983 | Lambertus . |
| 4,422,372 | 12/1983 | Hoezee ................................... 99/353 |
| 4,468,322 | 8/1984 | Fogarty, Jr. et al. . |
| 4,569,815 | 2/1986 | Rentz et al. . |
| 4,615,894 | 10/1986 | Ruegg ..................................... 26/516 |
| 4,630,533 | 12/1986 | Schaaf et al. ..................... 99/450.7 X |
| 4,652,225 | 3/1987 | Dehennau et al. . |
| 4,722,357 | 2/1988 | Bormioli ................................ 285/912 |
| 4,859,165 | 8/1989 | Hoashi ................................ 425/133.1 |
| 4,875,847 | 10/1989 | Wenger et al. ...................... 366/85 X |
| 4,960,043 | 10/1990 | Van Lengerich ......................... 99/353 |
| 4,984,514 | 1/1991 | Van Lengerich ...................... 99/348 X |
| 4,990,022 | 2/1991 | Watanabe et al. ..................... 285/362 |
| 5,013,498 | 5/1991 | Froeschke . |
| 5,190,772 | 3/1993 | Conselvan et al. . |
| 5,333,538 | 8/1994 | Sawa ................................ 425/131.1 X |
| 5,403,603 | 4/1995 | McCullough et al. .................. 426/233 |
| 5,433,490 | 7/1995 | Hurd et al. ............................. 285/360 |
| 5,435,236 | 7/1995 | Weinstein et al. ........................ 99/353 |
| 5,525,052 | 6/1996 | Czarnetzki et al. . |
| 5,577,437 | 11/1996 | Hurd . |
| 5,665,402 | 9/1997 | Czarnetzki et al. . |
| 5,776,534 | 7/1998 | Christensen et al. . |
| 5,919,509 | 7/1999 | Cremers et al. . |

FOREIGN PATENT DOCUMENTS

| | | |
|---|---|---|
| 60-225726 | 11/1985 | Japan . |
| 60-225728 | 11/1985 | Japan . |
| 7304519 | 10/1973 | Netherlands . |
| 587117 | 4/1977 | Switzerland . |
| 2070485 | 9/1981 | United Kingdom . |

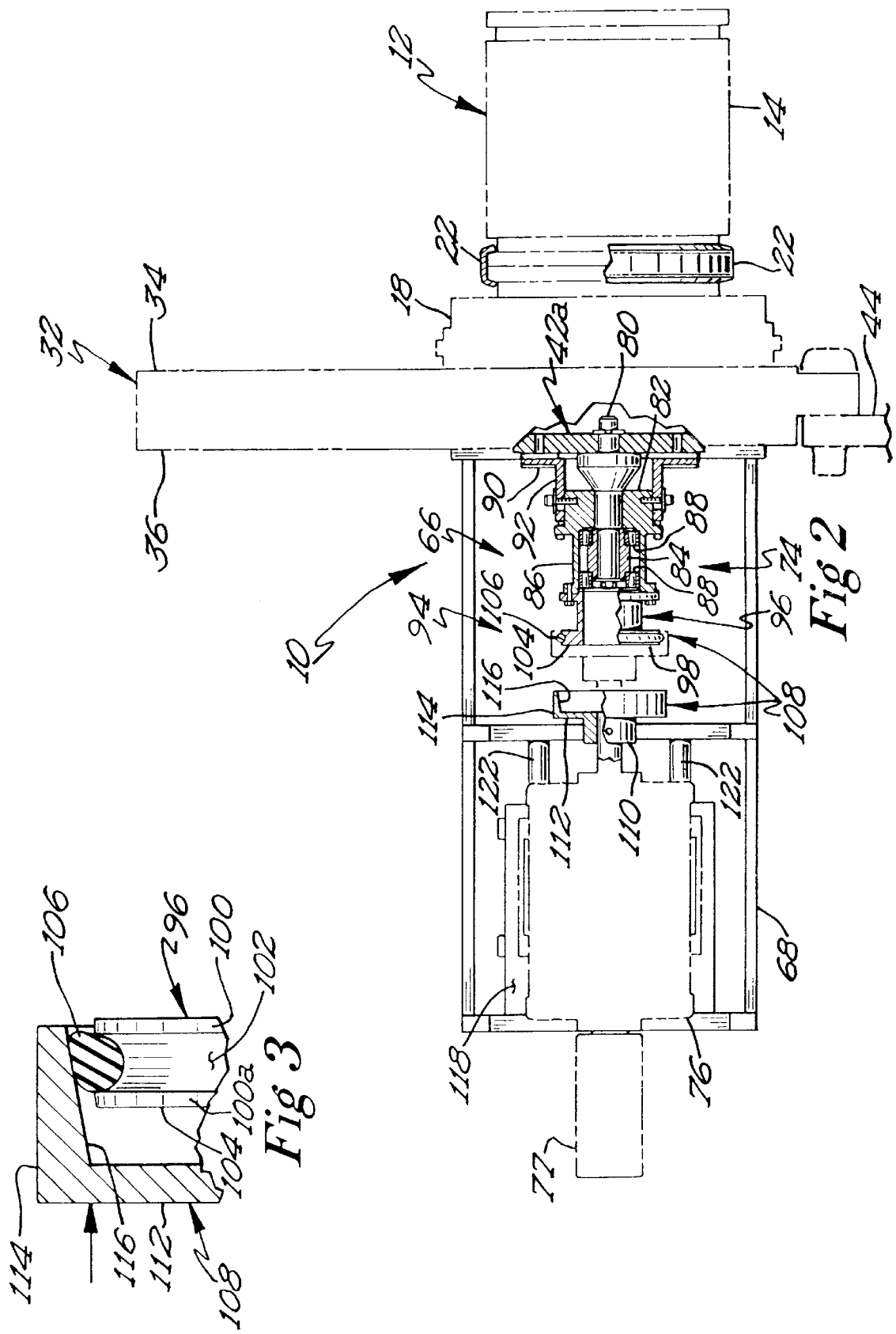

COOKER DIE AND ROTARY CUTTER REMOVABLY SECURING MECHANISM

BACKGROUND

The present invention generally relates to mechanisms for removably securing a die and rotary cutter to the discharge of a cooker and particularly relates to mechanisms for allowing the quick and easy change of a die and rotary cutter to the discharge of a cooker.

During the normal operation of a cooker/extruder, it becomes necessary and/or desirable to change the die from which the extrudate passes from the cooker and/or rotary cutter which cuts the extrudate passing from the die. For example, the die often becomes plugged, requiring it to be replaced with a clean one. Dies for forming complexly shaped products are especially prone to plugging and other die complications. Similarly, the die may be replaced with a die extruding extrudates of a differing configuration and/or size. Conventionally, dies were secured to cookers by a plurality of fasteners which were required to be removed and replaced each time the die was desired to be replaced. In addition to being very time consuming, removal and replacement of such fasteners typically required several personnel including mechanics. Further, in addition to personnel costs, the time required to replace the die takes the cooker out of production and loses the steady state conditions for the cooker.

U.S. Pat. No. 5,577,437 issued Nov. 26, 1996 discloses a cooker die removably securing mechanism representing a major advance in significantly reducing the time and personnel required to replace the die. Although not requiring taking the cooker out of production while the die was being changed, it was necessary to axially space the rotary cutter from the die to prevent the knives of the rotary cutter from catching on the die and/or slide plate. Although continuously rotating, dough, especially if of a sticky consistency, tended to bunch up under the knives when the cutter is retracted and before the new die was moved into position allowing the flow of food therethrough but before the rotary cutter was axially moved to abut the knives with the die, with the bunched up dough becoming sandwiched between the knives and the die face when the rotary cutter was axially slid back in place. Thus, the knives did not uniformly cut the extrudate, requiring the cooker to be taken out of production to remove the bunched up dough on the knives or to otherwise service the rotary cutter. Also, the knives of the rotary cutter wear and otherwise are damaged during normal operation such that the cooker had to be taken out of production whenever service was required on the rotary cutter.

Thus, a need exists for a mechanism that allows for the removable securement of the die and rotary cutter to the cooker which does not require the removal and replacement of a plurality of fasteners and which reduces the personnel required to replace the die and/or rotary cutter and which does not require the cooker to be taken out of production.

It is thus an object of the present invention to provide a novel mechanism for removably securing a die and rotary cutter to a cooker.

It is thus an object of the present invention to provide a novel mechanism for connecting and disconnecting a rotatable input to an output and allowing nonaxial movement between the input and output when disconnected and which is particularly adaptable for use but not limited for use with a cooker die and rotary cutter removably securing mechanism.

It is further an object of the present invention to provide such a novel cooker die and rotary cutter removably securing mechanism which does not require fasteners between the flange of the cooker and the die and rotary cutter.

It is further an object of the present invention to provide such a novel cooker die and rotary cutter removably securing mechanism which does not require the cooker to be taken out of production to replace or otherwise service the die and/or rotary cutter.

It is further an object of the present invention to provide such a novel cooker die and rotary cutter removably securing mechanism which reduces the personnel required to replace the die and/or rotary cutter.

It is further an object of the present invention to provide such a novel cooker die and rotary cutter removably securing mechanism resulting in improved product quality due to more frequent die and/or rotary cutter changes.

It is further an object of the present invention to provide such a novel cooker die and rotary cutter removably securing mechanism resulting in quicker system start-ups such as following down weekends.

It is further an object of the present invention to provide such a novel cooker die and rotary cutter removably securing mechanism resulting in increased productivity.

It is further an object of the present invention to provide such a novel cooker die and rotary cutter removably securing mechanism having reduced ingredient losses.

SUMMARY

Surprisingly, the above objects and other aims can be satisfied in the field of securing dies and rotary cutters to cookers by providing, in the preferred form, a slide plate including first and second die openings and slideable between a first position with the first die opening aligned therewith and a second position with the second die opening aligned therewith. A cutter assembly is mounted to the mechanism frame element for carrying thereby, with the cutter assembly including a rotary cutter rotatably engaged with each of the dies and moveable with the slide plate and dies. The rotary cutters are connected to and rotated by a motor when aligned with the cooker.

In further aspects of the present invention, a single motor is connected and disconnected to the rotary cutter of the die aligned with the cooker by a mechanism including a male coupling having an outer interface surface which is axially, slideably received in the inside interface surface of a female coupling.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows a partial, cross-sectional view of the cooker die and rotary cutter removably securing mechanism of FIG. 1 according to section lines 2—2 of FIG. 1, with portions shown in phantom.

FIG. 3 shows a partial, enlarged, cross-sectional view of the mechanism for connecting and disconnecting a rotatable input to an output included in the cooker die and rotary cutter removably securing mechanism of FIG. 1.

Figure 1:
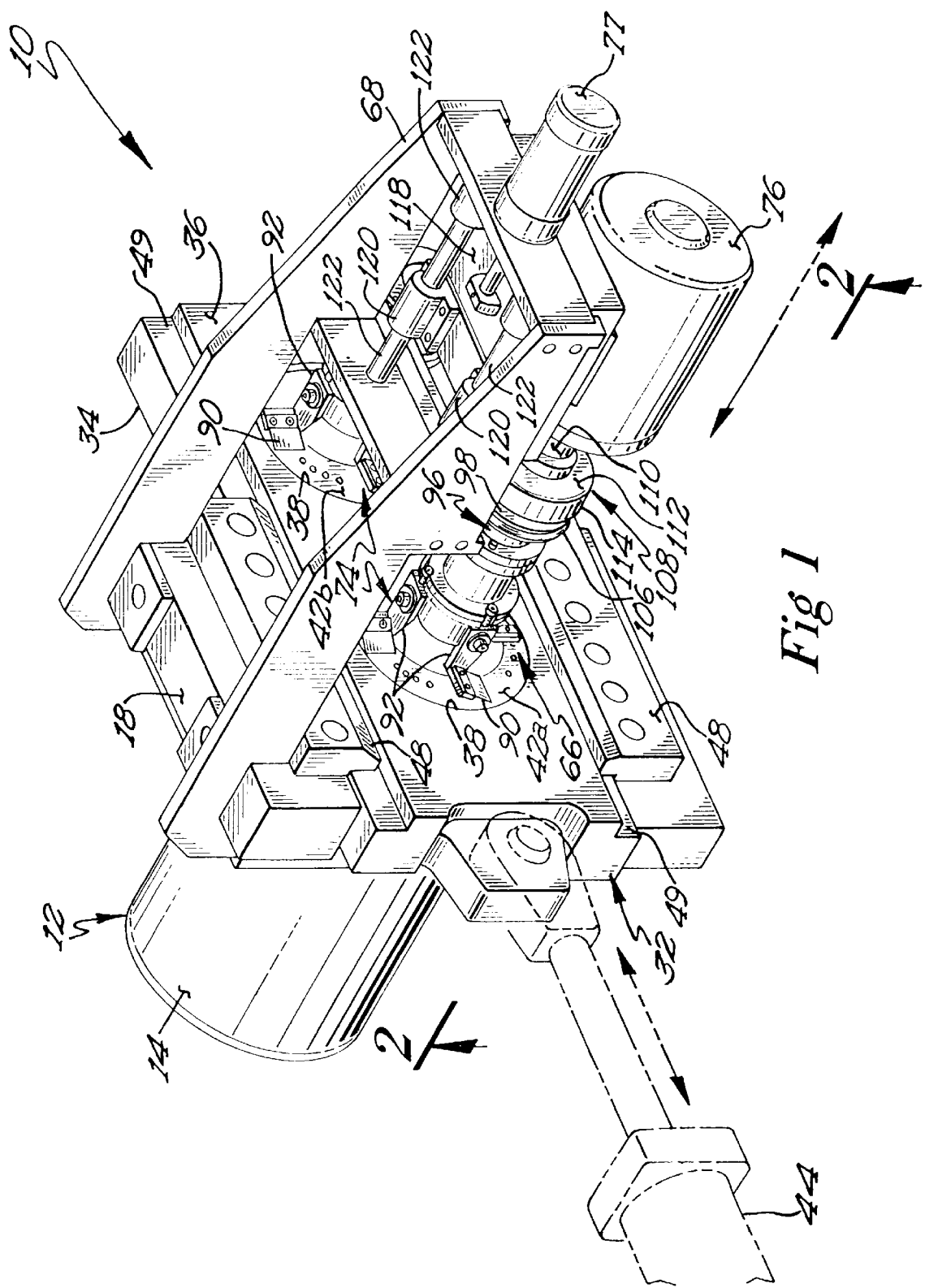
FIG. 1 shows a perspective view of a mechanism for removably securing a die and rotary cutter to a cooker/extruder according to the preferred teachings of the present invention, with portions shown in phantom to show constructional details.

All figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "front", "back", "height", "width", "length", "end", "side", "horizontal", "vertical", "axial", "radial", and similar terms are used herein, it should be understood that these terms have reference only to the structure shown in the drawings as it would appear to a person viewing the drawings and are utilized only to facilitate describing the preferred embodiment.

DESCRIPTION

A mechanism for removably securing a die and rotary cutter to a continuous cooker/extruder for allowing the quick and easy removal and/or installation of the die and rotary cutter to the cooker/extruder according to the preferred teachings of the present invention is shown in the drawings and generally designated 10. In the most preferred embodiment of the present invention, mechanism 10 is an improvement of the type shown and described in U.S. Pat. No. 5,577,437. For purpose of explanation of the basic teachings of the present invention, the same numerals designate the same or similar parts in the present figures and the figures of U.S. Pat. No. 5,577,437. The description of the common numerals and mechanism 10 may be found herein and in U.S. Pat. No. 5,577,437, which is hereby incorporated herein by reference.

Mechanism 10 of the most preferred form can be utilized on a continuous cooker/extruder 12 including a barrel 14, with cooker/extruder 12 being of any desired configuration including but not limited to of the type shown in U.S. Pat. Nos. 5,577,437; 5,776,534; or 5,919,509, each of which are incorporated herein by reference. Mechanism 10 generally includes a mechanism frame element 18 which is secured in a fixed position relative to barrel 14 of cooker/extruder 12 by any suitable means. In the most preferred form shown, each of barrel 14 and frame element 18 includes a groove spaced from but adjacent to their axial ends for receipt of a clamp 22. However, it can be appreciated that mechanism frame element 18 can be mounted to cooker/extruder 12 in a variety of manners depending upon the particular cooker/extruder 12. In the most preferred form shown, barrel 14 and cooker/extruder 12 are arranged horizontally.

Mechanism 10 further includes a horizontal slide plate 32 including spaced, planar, parallel, upstream and downstream surfaces 34 and 36 extending generally perpendicular to the axis of barrel 14 and cooker/extruder 12. Upstream surface 34 abuts against and slides on the free end of barrel 14 or an extension thereof. Slide plate 32 includes first and second die openings 38 extending from upstream surface 34 to downstream surface 36 and having parallel axes arranged in the same horizontal plane. First and second dies 42a and 42b of a standard design are slideably received in openings 38 and held therein by any desired locking techniques. Dies 42a and 42b have upstream surfaces which are generally coextensive with upstream surface 34 when dies 42a and 42b are received in openings 38.

First and second slide pressure plates 48 are held in a fixed position along the upper and lower edges of mechanism frame element 18 by any suitable means such as screws as shown and have their upstream faces slideably abutting with downstream surface 36 of slide plate 32. In the most preferred form, slide plate 32 includes linear shoulders 49 adjacent its upper and lower edges for slideably receiving pressure plates 48. It should then be appreciated that slide plate 32 is axially captured between frame element 18 and pressure plates 48, but is also laterally and horizontally slideable therebetween.

Mechanism 10 further includes a suitable mechanism 44 such as a hydraulic cylinder shown for sliding slide plate 32 relative to frame element 18 and cooker/extruder 12 and specifically to align one or the other of dies 42a and 42b with barrel 14. Hydraulic cylinder 44 is secured between frame element 18 and slide plate 32 and strokes slide plate 32 in a straight linear path in the preferred form.

According to the most preferred form of the present invention, mechanism 10 further includes a cutter assembly 66. Cutter assembly 66 generally includes a framework or cutter frame 68 held in a fixed position relative to cooker/extruder 12 and in the preferred form mounted to mechanism frame element 18. In the most preferred form, cutter frame 68 is suitably mounted to the upper edge of mechanism frame element 18. Cutter assembly 66 further includes first and second rotary cutters 74 rotatably mounted about a horizontal axis to abut with dies 42a and 42b, respectively, received in die openings 38 and moveable with slide plate 32. Rotary cutters 74 are of a diameter generally equal to die 42a or 42b and preferably less than openings 38. Rotary cutters 74 are rotated by suitable provisions such as an electric motor 76 shown. Motor 76 is slideably mounted to cutter frame 68 for axial movement relative to rotary cutters 74 between an engaged condition and a disengaged condition. Specifically in the preferred form, motor 76 is mounted to a mounting plate 118 including two pairs of linear bearings 120 slideable on first and second, parallel, slide shafts 122 secured inside cutter frame 68. Suitable provisions 77 such as an air cylinder may be provided to mechanically slide motor 76 in cutter frame 68, with air cylinder 77 mounted to frame 68 and including its piston rod connected to the mounting plate 118 of motor 76 in the most preferred form. For portability, mechanism 10 can be mounted on transport wheels in the most preferred form, and the mounting of cutter assembly 66 to mechanism frame element 18 allows movement as a unit from one cooker/extruder 12 to another in an emergency and makes it simple for storage, if necessary.

In the preferred form shown, first and second rotary cutters 74 are of an identical construction. First and second rotary cutters 74 are rotatably mounted relative to dies 42a and 42b and are mounted for movement with slide plate 32. In the most preferred form, each rotary cutter 74 includes a center shaft 80 extending axially from the respective die 42a or 42b and defining the rotation axis of rotary cutter 74. As an example, shaft 80 could be threadably received in die 42a or 42b, could extend through die 42a or 42b and be axially fixed thereto such as by a snap ring or by being threadably received in a nut, or the like. An annular cutter head 82 is suitably rotatably mounted on center shaft 80. In the most preferred form, a bearing spacer or hub 84 is suitably fixed on center shaft 80 such as by a bolt threadably received in the free end of center shaft 80 and sandwiching a washer against a shoulder formed in the central bore of hub 84 and the free end of center shaft 80. A cylindrical mount 86 is rotatably mounted to hub 84 by suitable provisions 88 such as first and second roller bearings as shown located and axially fixed between hub 84 and cylindrical mount 86. Cutter head 82 is suitably secured to the downstream face of mount 86 such as by being integrally formed therewith. A plurality of radially extending knives 90 abut and slide on the downstream face of die 42*a* or 42*b* and cut the food exiting die 42*a* or 42*b* into axial lengths. In the most preferred form, knives 90 are mounted to cutter head 82 by L-shaped brackets 92.

Cutter assembly 66 further includes suitable provisions 94 for disconnecting rotary cutters 74 from motor 76 when it is desired to slide slide plate 32 and thereby allowing nonaxial relative movement between motor 76 and rotary cutters 74 and for connecting motor 76 to rotary cutters 74 when aligned with barrel 14 and cooker/extruder 12 and in the most preferred form without stopping rotation of motor 76. In the most preferred form, provisions 94 includes a first cylindrical, male coupling 96 suitably attached to hub 84 of each rotary cutter 74 such as by screws. Coupling 96 includes a radially extending diametric flange 98 terminating in an outer, generally axially extending peripheral surface 100. A circumferential groove 102 is formed in surface 100 and is generally semicircular in cross section. The portion 100*a* of surface 100 intermediate groove 102 and the axial end 104 of coupling 96 opposite to knives 90 is beveled at a nonparallel angle to the axis of rotary cutter 74 defined by center shaft 82 and in the most preferred form extends at an angle in the order of 10° inwardly towards the rotation axis of rotary cutter 74 from groove 102 towards axial end 104. A rubber or similar elastomeric band 106 is positioned in groove 102 in a tensioned condition. Band 106 in the preferred form has circular cross sections of a diameter generally equal to the diameter of the cross sections of groove 102. It can then be appreciated that band 106 received in groove 102 defines or forms an outer interface surface on coupling 96.

In the most preferred form shown, provisions 94 further include a second, female coupling 108 suitably attached to the drive shaft of motor 76 for axially receiving one of male couplings 96 provided on rotary cutters 74. In particular, coupling 108 includes a hub 110 for slideable receipt on the drive shaft of motor 76 in an axially fixed and nonrotatable condition relative to the drive shaft. An annular flange 112 extends radially from hub 110. A cylindrical body 114 extends axially from the perimeter of flange 112 and concentric to the axis of the drive shaft of motor 76. Body 114 includes an inside interface surface 116 extending at a nonparallel angle to the axis of the drive shaft of motor 76 and in the most preferred form extends at an angle in the order of 10° outwardly away from the axis of the drive shaft of motor 76 and the rotation axis of cutter 74 from flange 112 towards the free axial end of body 114. In the most preferred form, the angle of surface 116 corresponds to and is generally equal to the angle of portion 100*a*. The size or diameter of surface 116 is generally equal to and for slideably receiving the outer diameter of band 106 received in groove 102 of coupling 96.

It should be appreciated that suitable shields such as a cabinet can be provided to prevent access to slide plate 32 when it is being slid by hydraulic cylinder 44 but still allow access to allow removal and replacement of die 42*a* or 42*b* including the associated rotary cutter 74 from openings 38 which is not in axial alignment with barrel 14. Suitable electrical interlocks can be provided to prevent operation of cylinders 44 and/or 77 when the access doors are open for safety reasons.

Now that the basic construction of mechanism 10 according to the preferred teachings of the present invention has been set forth, the operation and major advantages of mechanism 10 can be explained. For the sake of explanation, it will be assumed that slide plate 32 is in the position shown in FIG. 1 with die 42*a* axially aligned with barrel 14. In operation, food from cooker/extruder 12 is moved under pressure through barrel 14 towards and through die 42*a*, with the food extrudates passing from die 42*a* being cut to axial lengths due to the rotation of rotary cutter 74 associated with die 42*a*.

In the event that it is desired to change die 42*a* such as in the event that die 42*a* becomes partially blocked, that it is desired to form different shaped extrudates, that the rotary cutter 74 associated with die 42*a* requires servicing, and/or the like, and assuming that die 42*b* including its associated rotary cutter 74 is in position in slide plate 32, cylinder 77 can be actuated to slide motor 76 axially away from cooker/extruder 12 from its engaged position to its disengaged position to pull coupling 108 from coupling 96 while motor 76 continues to rotate the drive shaft, with couplings 96 and 108 being axially spaced and rotationally independent. After coupling 108 is pulled from coupling 96 allowing relative movement between motor 76 and rotary cutters 74 in a nonaxial direction, hydraulic cylinder 44 can be actuated to stroke slide plate 32 relative to barrel 14 in a straight linear path in the most preferred form to move die 42*a* and the associated rotary cutter 74 to be positioned out of axial alignment with barrel 14 and move die 42*b* and the associated rotary cutter 74 to be positioned in axial alignment with barrel 14. After die 42*b* is in position, cylinder 77 can be actuated to slide motor 76 axially toward cooker/extruder 12 from its disengaged position to its engaged position to axially move coupling 108 unto coupling 96 with axial end 104 of coupling 96 initially extending into coupling 108 and while motor 76 continues to rotate the drive shaft, with couplings 96 and 108 being engaged and rotate together or in other words are rotationally related. When coupling 108 is on coupling 96, motor 76 will rotate rotary cutter 74 associated with die 42*b*.

It should be noted that sliding of motor 76 and of slide plate 32 can be performed with continued operation of cooker/extruder 12, with cylinder 44 moving slide plate 32 with sufficient pressure to overcome any sliding friction created by food pushing against die 42*a* and with sufficient speed such that switching one of the dies 42*a* and 42*b* axially positioned in line with barrel 14 with the other of the dies 42*a* or 42*b* is only momentary. Thus, excessive food pressure will not be created by food pushing against slide plate 32 intermediate openings 38 during changing of dies 42*a* and 42*b*, with the sliding of slide plate 32 in the preferred form taking approximately ½ second. Additionally, as knives 90 of rotary cutters 74 always abut with the downstream face of die 42*b*, any tendency of food to bunch under and/or become sandwiched between knives 90 and die 42*b* is minimized if not eliminated, even though the extrudate can be exiting die 42*b* after it is in position but before couplings 96 and 108 are engaged causing motor 76 to rotate rotary cutter 74 of die 42*b*. Any extrudate from die 42*a* or 42*b* which is not uniformly cut and/or which has excessive length during the time typically in the range of less than fifteen seconds and when dies 42*a* or 42*b* are repositioned and/or when rotary cutter 74 is not being rotated by motor 76 can be disposed of in any desired manner.

It should then be appreciated that with die 42*b* in axial alignment with barrel 14, die 42*a* and rotary cutter 74 associated therewith can be removed from opening 38 of slide plate 32 and can be unplugged or otherwise serviced or can be replaced with a die of a differing configuration. In the event that it is desired to change die 42b, cylinder 77 can be actuated to slide motor 76 axially away from cooker/extruder 12, hydraulic cylinder 44 can be actuated to stroke slide plate 32 in the opposite direction to again position die 42b out of axial alignment with barrel 14 and position die 42a in axial alignment with barrel 14 and cylinder 77 can be actuated to slide motor 76 toward cooker/extruder 12 to rotate rotary cutter 74 associated with die 42a.

Prior to the present invention, when die 42a became plugged, it was often necessary to remove multiple fasteners which attached die 42a to cooker/extruder 12 to change the plugged die 42a with a clean die 42b. The head including the plugged die 42a was then replaced with a spare head including the clean die 42b. Then, each of the fasteners were replaced. This change typically took about one hour to accomplish. Alternatively or additionally, when rotary cutter 74 needed servicing such as a result of food build up on the knives, replacement of knives, or the like, it was necessary to shut down cooker/extruder 12 for the servicing of rotary cutter 74. Using mechanism 10 according to the preferred teachings of the present invention, changing a plugged die 42a and/or rotary cutter 74 requiring servicing with a clean die 42b and/or a serviced rotary cutter 74 only takes about one and one-half seconds, with this change being accomplished by simply actuating cylinders 44 and 77 and specifically without requiring removal and replacement of fasteners between cooker/extruder 12 and die 42a and 42b and/or shutting down cooker/extruder 12. Thus, there is a direct production gain of about one hour multiplied by the extrudate production rate per minute for cooker/extruder 12 utilizing mechanism 10 according to the teachings of the present invention.

In addition to this directly observable reduction in the amount of time required to change dies 42a and 42b and/or rotary cutters 74, there are numerous indirect benefits. For example, prior to the present invention, the operator of cooker/extruder 12 could not personally change die 42a and/or axially move the prior rotary cutter away from and toward dies 42a and 42b. Rather, one or more maintenance workers had to be found to substitute die 42a and move the prior rotary cutter. Unfortunately, maintenance workers may not be readily available when the need for the clean die 42b and/or serviced rotary cutter 74 occurs. Thus, the operator was faced with a choice between two undesirable alternatives. First, the operator could continue to make off-specification product. In the alternative, the operator could shut down cooker/extruder 12 until maintenance workers could be found to substitute die 42a and/or rotary cutter 74. Using mechanism 10 according to the preferred teachings of the present invention, die 42b and a serviced rotary cutter 74 can be substituted by the operator personally. Thus, the time looking for maintenance workers is also recovered. This is also a significant advantage when numerous cooker/extruders 12 are desired to be started simultaneously such as following down weekends.

Another indirect advantage is an increase in product quality. Due to the time requirements and inconvenience of changing dies 42a and/or rotary cutters 74 prior to the present invention, changeovers of dies 42a and/or rotary cutters 74 do not occur as often as they should. As a result, cooker/extruders 12 having dies 42a which are partially plugged and/or rotary cutters 74 which required servicing are continued to be operated, forming inferior product, until the plugging and/or cutting becomes more severe. Additionally, the come-up time to steady state conditions for cooker/extruders 12 can be considerable, on the order of ½ to 1 hour. If cooker/extruder 12 is shut down for more than a few seconds (such as for substituting die 42a and/or for servicing rotary cutter 74 prior to the present invention and/or finding maintenance workers to perform the substitution), cooker/extruder 12 can lose its steady state conditions. Specifically, the material being held in cooker/extruder 12 experiences an overcook and subsequent increase in viscosity. In order to get this overcooked product out of cooker/extruder 12, additional water must be added. When cooker/extruder 12 is restarted, an initial 35 to 45 minutes of production is lost as off-specification product in cooker/extruder 12 is produced/extruded to allow cooker/extruder 12 to come up to steady state conditions. As mechanism 10 according to the preferred teachings of the present invention allows dies 42a and rotary cutter 74 to be changed without shutting down cooker/extruder 12, loss of steady state conditions does not occur and the recovery time of cooker/extruder 12 is reduced from approximately one hour to nothing. Typically, dies 42a and 42b require changing more frequently than rotary cutters 74 require servicing, with dies 42a and 42b requiring change every 8½ to 24 hours. Thus, the total production time of cooker/extruder 12 producing specification product can be increased by at least 1½ to 2 hours resulting in increased production when die 42a and rotary cutter 74 are replaced utilizing mechanism 10 according to the preferred teachings of the present invention over typical prior die replacement techniques.

Furthermore, provisions 94 according to the teachings of the present invention are believed to be advantageous and produce synergistic results with mechanism 10 according to the teachings of the present invention. Specifically, provisions 94 allow the connection and disconnection of a rotatable input (the rotatable shaft of motor 76 in the preferred form shown) to an output (the annular cutter head 82 of rotary cutter 74 which is also rotatable in the preferred form shown) and allowing nonaxial movement between the rotatable input and the output when disconnected by simply axially moving couplings 96 and 108 relative to each other and specifically without requiring the operator to insert pins or other connector members between couplings 96 and 108. Thus, provisions 94 allow the connection and disconnection and allow the nonaxial movement to be made on the fly or in other words with the shaft of motor 76 continuously rotating and without requiring motor 76 to be stopped. The friction between band 106 and inside surface 116 provides a generally nonslip relation between couplings 96 and 108, with the angular relation of portion 100a and of inside surface 116 allowing coupling 96 to be inserted into coupling 108 with increasing torque transfer therebetween. Furthermore, the preferred construction of provisions 94 allows rotational interconnection between couplings 96 and 108 even if the rotational axes defined by the rotational shaft of motor 76 and center shaft 80 are not aligned and/or parallel to each other which can be a problem when the input and output are moveable in nonaxial directions relative to each other. Further, since provisions 94 allow relative movement in a nonaxial direction between motor 76 and rotary cutters 74, a single motor 76 can be used to rotate two (or more) rotary cutters 74 and thereby reducing capital costs as motor 76 is relatively expensive.

Now that the basic teachings of the present invention have been explained, many extensions and variations will be obvious to one having ordinary skill in the art. For example, although mechanism 10 of the most preferred form includes the combination of several, unique features believed to obtain synergistic results, mechanisms for removably securing dies and/or rotary cutters, connection and disconnection mechanisms, and/or rotary cutters could be constructed according to the teachings of the present invention including such features singly or in other combinations. As an example, mechanism 10 could be utilized according to the teachings of the present invention with other manners of allowing connection and disconnection of motor 76 with rotary cutters 74, or the like. Similarly, provisions 94 could be utilized in environments other than connecting and disconnecting motor 76 to rotary cutters 74 according to the teachings of the present invention. Likewise, although slide plate 32 is slid in a straight linear path in the preferred form, mechanism 10 could include provisions for mounting and/or sliding slide plate 32 including two or more die openings 38 in other manners utilizing the teachings of the present invention including but not limited to arcuately. Additionally, although rotary cutters 74 are rotatably mounted to dies 42a and 42b in the most preferred form, rotary cutters 74 could have other configurations and could be mounted for movement with dies 42a and 42b and slide plate 32 including but not limited to directly to slide plate 32 according to the teachings of the present invention. Furthermore, it can be appreciated that couplings 96 and 108 can be reversed from that shown and described according to the teachings of the present invention.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Mechanism for removably securing a die to a food cooker/extruder comprising, in combination: a slide plate having an upstream surface, a downstream surface and at least first and second die openings extending from the upstream surface to the downstream surface for receiving dies; means for sliding the slide plate for positioning one of the die openings in alignment with the food cooker/extruder; at least first and second rotary cutters rotatably mounted about a rotation axis to abut with the die received in the first and second die openings and movable with the slide plate; means for providing rotation to the rotary cutters; and means for disconnecting the rotation providing means from the rotary cutter when it is desired to slide the slide plate and for connecting the rotation providing means to the rotary cutter aligned with the food cooker/extruder.

2. The mechanism of claim 1 wherein the disconnecting and connecting means disconnects and connects the rotation providing means to the rotary cutter without stopping rotation of the rotation providing means.

3. The mechanism of claim 2 wherein the disconnecting and connecting means comprises, in combination: means for axially moving the rotation providing means relative to the rotary cutter between an engaged condition and a disengaged condition; a first coupling provided on each of the rotary cutters; and a second coupling provided on the rotation providing means, with the first and second couplings being rotationally related when engaged and being rotationally independent and relatively moveable in a nonaxial direction when axially spaced.

4. The mechanism of claim 3 wherein the first coupling is one of a male coupling and a female couplings, with the male coupling being axially received within the female coupling when the rotation providing means is moved from the disengaged condition to the engaged position, with the second coupling being the other of the male coupling and the female coupling.

5. The mechanism of claim 4 wherein the male coupling includes an outer, generally axially extending, cylindrical peripheral portion having an outer interface surface; and wherein the female coupling includes a cylindrical body having an inside interface surface of a size generally equal to and for slideably receiving the outer interface surface of the male coupling.

6. The mechanism of claim 5 wherein the inside interface surface extends outwardly at a nonparallel angle to the rotation axis of the rotary cutter.

7. The mechanism of claim 6 wherein the outer interface surface comprises, in combination: a groove formed in the cylindrical peripheral portion, and an elastomeric band received in the groove.

8. The mechanism of claim 7 wherein the male coupling includes an axial end which initially extends into the female coupling; and wherein the outer interface surface is beveled inwardly at a nonparallel angle to the rotation axis of the rotary cutter.

9. The mechanism of claim 8 wherein the nonparallel angle of the outer interface surface is generally equal to the nonparallel angle of the inner interface surface.

10. The mechanism of claim 5 wherein the outer interface surface comprises, in combination: a groove formed in the cylindrical peripheral portion, and an elastomeric band received in the groove.

11. The mechanism of claim 3 wherein the axially moving means comprises, in combination: a cutter frame held in a fixed position relative to the cooker/extruder; and means for slideably mounting the rotation providing means to the cutter frame.

12. The mechanism of claim 11 wherein the rotation providing means comprises an electric motor having a rotatable drive shaft.

13. The mechanism of claim 1 wherein the sliding means comprises means for sliding the slide plate in a straight linear path.

14. The mechanism of claim 13 wherein the sliding means comprises, in combination: a mechanism frame element removably secured in a fixed position relative to the cooker/extruder; and at least a first pressure plate held in a fixed position to the mechanism frame element, with the slide plate being axially captured between the mechanism frame element and the first pressure plate.

15. The mechanism of claim 1 wherein the rotary cutters are rotatably mounted to the dies.

16. The mechanism of claim 15 wherein the rotary cutters each comprise, in combination: a center shaft extending axially from the die; an annular cutter head rotatably mounted on the center shaft; and a plurality of knives mounted to the cutter head and abutting and sliding on the die.

17. Mechanism for connecting and disconnecting a rotatable input to an output and allowing nonaxial movement between the rotatable input and the output when disconnected, comprising, in combination: a male coupling including an outer, generally axially extending, cylindrical peripheral portion having an outer interface surface; and a female coupling including a cylindrical body having an inside interface surface of a size generally equal to and for slideably receiving the interface surface of the male coupling, with the male coupling being rotatably attached to one of the input and the output and the female coupling being rotatably attached to the other of the input and the output, with the input and output being rotationally related when the male coupling is received in the female coupling and being rotationally independent and moveable in a nonaxial direction when the male coupling is axially spaced from the female coupling.

18. The mechanism of claim 17 wherein the inside interface surface extends outwardly at a nonparallel angle to the rotation axis of the rotary cutter.

19. The mechanism of claim 17 wherein the outer interface surface comprises, in combination: a groove formed in the cylindrical peripheral portion, and an elastomeric band received in the groove.

20. The mechanism of claim 19 wherein the male coupling includes an axial end which initially extends into the female coupling; and wherein the outer interface surface is beveled inwardly at a nonparallel angle to the rotation axis of the rotary cutter.

* * * * *